UNITED STATES PATENT OFFICE 1,931,123

METHOD OF ISOLATING α-ARYL-β-AMINO-ETHANOLS AND COMPOUND SO OBTAINED

Gordon A. Alles, Monterey Park, Calif.

No Drawing. Application April 2, 1930
Serial No. 441,176

4 Claims. (Cl. 260—128.5)

This invention relates to a novel method of isolating an α—aryl-β-aminoethanol and to the new compound so obtained.

The method of isolating an α—aryl-β-aminoethanol according to the present invention consists of the conversion of the α—aryl-β-aminoethanol, prepared by any desired method, into the neutral sulphate and crystallization of this salt from a solvent therefor. Formerly, other salts or derivatives of an α—aryl-β-aminoethanol were used for isolation but none of those previously worked with are as suitable because of unsatisfactory physical or chemical properties. The isolation of an α—aryl-β-aminoethanol as the neutral sulphate is particularly advantageous, due to its moderate to low solubility in common crystallizing solvents, good tendency to crystallize and ready conversion into any commonly desired salt or derivative of the α—aryl-β-aminoethanol.

The invention also includes the new chemical compound obtained from the above isolation method, which consists of a neutral sulphate of an α—aryl-β-aminoethanol.

(R—CHOH—CH2NH2)2.H2SO4, in which R may be any one of a considerable number of aryl groups or radicals. For example, the radical R may be selected from among the following list: phenyl, C6H5—; 4-methyl-phenyl, CH3—C6H4—; 4-methoxy-phenyl, CH3O—C6H4—; 3,4-dimethoxy-phenyl, (CH3O)2=C6H3—; and 3,4-methylene-dioxy-phenyl, (CH2O2)=C6H3—. The β—aminoethanols of these α—aryl radicals, and their salts, are physiologically active and produce effects in animals and man similar to the effects of epinephrine and its salts, and the neutral sulphates thereof may be readily purified and serve as effective agents for therapeutic administration of such compounds.

The preferred method of carrying out the isolation of an α—aryl-β-aminoethanol is as follows:

(1) The α—aryl-β-aminoethanol, if not already in the form of the free base, is obtained as the free base by treating an acid aqueous solution containing a salt of the base with a strong alkali. The basic layer thus formed is separated from the aqueous solution and contains the desired α—aryl-β-aminoethanol compound. The product thus obtained, however, is ordinarily in a crude or somewhat impure state, being contaminated by the presence of small amounts of other materials such as reagents employed in the synthesizing thereof, or side products of the reactions involved in the synthesis. This condition is true, moreover, regardless of the particular method of synthesis employed, and it is therefore necessary in any case, when it is desired to obtain the product in suitable form for therapeutic administration, to further isolate or purify the compound, and it will be understood that the hereinafter described method of isolation or purification is of general application for this purpose, as applied to any α—aryl-β-aminoethanol product, regardless of the method by which the product may have been synthesized.

(2) The free base is then exactly neutralized with sulphuric acid in aqueous solution and the resultant neutral sulphate of the α aryl-β-aminoethanol crystallized from water, alcohol, mixtures thereof or other solvent for the salt. The aryl-aminoethanol is thus converted into its neutral sulphate, (R—CHOH—CH2NH2)2.H2SO4, which readily crystallizes from water or alcohol without solvent of crystallization. All of these neutral sulphates are moderately soluble in water. The sulphates of the α aryl-β-aminoethanols containing the respective aryl groups or radicals above mentioned give analyses corresponding to the following formulæ and have melting points as listed:

Phenyl-aminoethanol sulphate
  (C6H5—CHOH—CH2NH2)2.H2SO4 M. P. 256° C.
4-Methyl-phenyl-aminoethanol sulphate
  (CH3—C6H4—CHOH—CH2NH2)2.H2SO4
    M. P. 252° C.
4-Methoxy-phenyl-aminoethanol sulphate
  (CH3O—C6H4—CHOH—CH2NH2)2.H2SO4
    M. P. 236° C.
3,4-Dimethoxy-phenyl-aminoethanol sulphate
  ((CH3O)2=C6H3—CHOH—CH2NH2)2.H2SO4
    M. P. 194° C.
3,4-Methylene-dioxy-phenyl-aminoethanol sulphate
  ((CH2O2)=C6H3—CHOH—CH2NH2)2.H2SO4
    M. P. 236° C.

As a specific example of the method of isolation of an aryl-aminoethanol in accordance with the present invention, and the product thereof, the compound α-phenyl-β-aminoethanol, prepared in any suitable manner, may first be obtained as the free base, if not already in this form, by adding caustic alkali to an aqueous solution of a salt thereof until the same is strongly alkaline. The basic layer that forms is separated from the aqueous solution and contains the desired compound, α-phenyl-β-aminoethanol. This product is then neutralized with a dilute sulphuric acid solution converting it into the neutral sulphate, (C6H5CHOH—CH2NH2)2.H2SO4 which is then obtained in the solid state by concentration of the resultant solution. This solid is crystallized from water, alcohol, water-alcohol mixtures or other solvent therefor by dissolving into a heated solution and cooling. The sulphate is thus purified from other materials present as impurities. The purified, neutral α-phenyl-β-aminoethanol sulphate $(C_6H_5\text{—}CHOH\text{—}CH_2NH_2)_2.H_2SO_4$ is a white crystalline material melting at 256° C. and giving analyses corresponding to calculated values.

I claim:

1. The neutral sulphate of an α aryl-β-aminoethanol, in which the aryl group is selected from the following list,—phenyl, 4-methyl-phenyl, 4-methoxy-phenyl, 3,4-dimethoxy-phenyl, 3,4-methylene-dioxy-phenyl.

2. The neutral sulphate of α-phenyl-β-aminoethanol.

3. The method of isolation of an α aryl-β-aminoethanol in which the aryl group is selected from the following list,—phenyl, 4-methyl-phenyl, 4-methoxy-phenyl, 3,4-dimethoxy-phenyl, 3,4-methylene-dioxy-phenyl,—which consists of conversion thereof into a neutral sulphate by addition of sulphuric acid, and crystallization of the sulphate so formed from a solvent therefor.

4. The method of isolation of α-phenyl-β-aminoethanol which consists of conversion thereof into a neutral sulphate by addition of sulphuric acid, and crystallization of the sulphate from a solvent therefor.

GORDON A. ALLES.